(No Model.) 2 Sheets—Sheet 1.

R. W. HARE.
TWO WHEELED VEHICLE.

No. 411,720. Patented Sept. 24, 1889.

WITNESSES:
N. C. Evert.
Albert B. Blackwood

INVENTOR
Robert W. Hare
BY Connell Bros
ATTORNEYS (No Model.) 2 Sheets—Sheet 2.

R. W. HARE.
TWO WHEELED VEHICLE.

No. 411,720. Patented Sept. 24, 1889.

WITNESSES.
Albert B. Blackwood
G. Smith

INVENTOR.
Robt W. Hare

UNITED STATES PATENT OFFICE.

ROBERT W. HARE, OF ALLEGHENY, PENNSYLVANIA.

TWO-WHEELED VEHICLE.

SPECIFICATION forming part of Letters Patent No. 411,720, dated September 24, 1889.

Application filed July 24, 1888. Serial No. 280,896. (No model.)

*To all whom it may concern:*

Be it known that I, ROBERT W. HARE, a citizen of the United States, residing at Allegheny, in the county of Allegheny and State of Pennsylvania, have invented certain new and useful Improvements in Two-Wheeled Vehicles; and I do hereby declare the following to be a full, clear, and exact description of the invention, reference being had to the accompanying drawings, which form part of this specification.

This invention has relation to two-wheeled vehicles, and has for its object the provision of means whereby the vehicle-body is regulated.

This invention therefore consists in a two-wheeled vehicle having an adjustable body and means for operating and regulating the same.

This invention further consists in peculiar mechanism adapted and designed for the accurate adjustment of the body of the vehicle.

This invention still further consists in the novel construction, combination, and arrangement of parts more fully referred to hereinafter, and specifically pointed out in the claims.

This invention has for its main object to equalize the load or weight on two-wheeled vehicles, thereby relieving weight from the horse's back or strain from the springs.

The great disadvantage in two-wheeled vehicles heretofore has been to maintain their equilibrium after the load or cargo has been placed in the vehicle. Either the load causes the vehicle to dip back or else to be a heavy strain on the horses.

My improved two-wheeled vehicle can be easily regulated to concentrate the dead-weight directly upon the springs and axle, and by so doing will render the vehicle perfectly balanced, which not alone adds to the smoothness of its travel but gives ease to the occupants and relieves the strain upon the horse. It will also be understood that by perfectly equalizing the weight on the springs and axle it will not require more than one-half the motive power which it necessarily requires at present.

Figure 1:
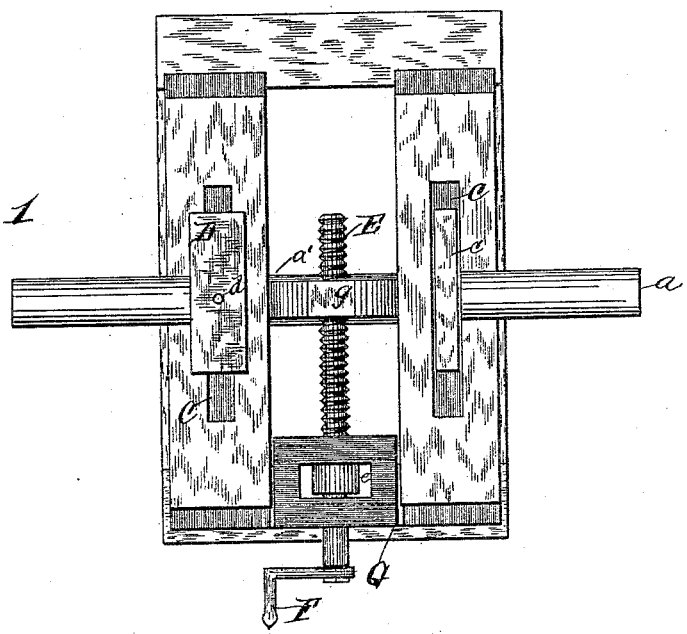
Figure 4:
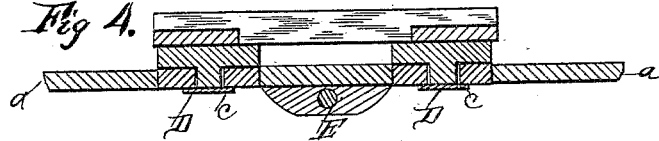
Figure 2:
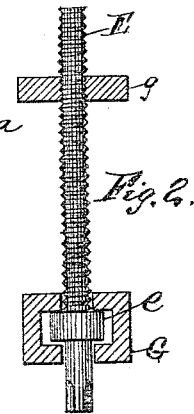
Figure 3:
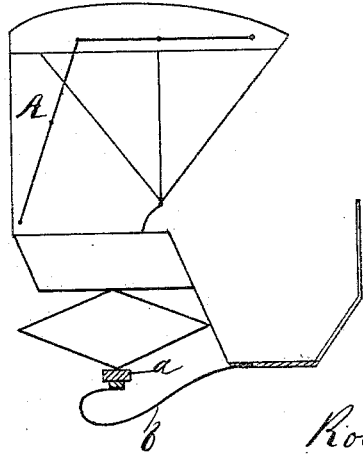
Figure 5:
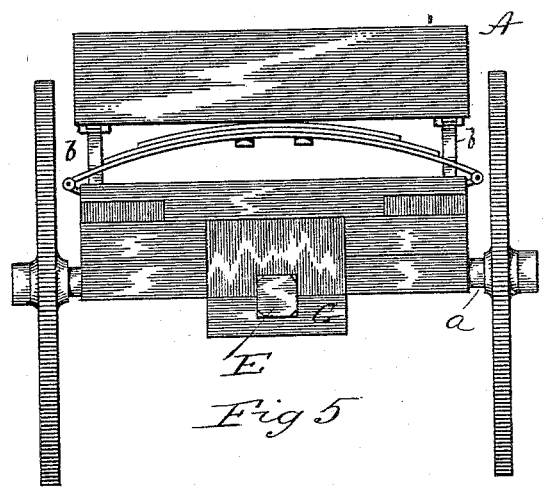
Figure 6:
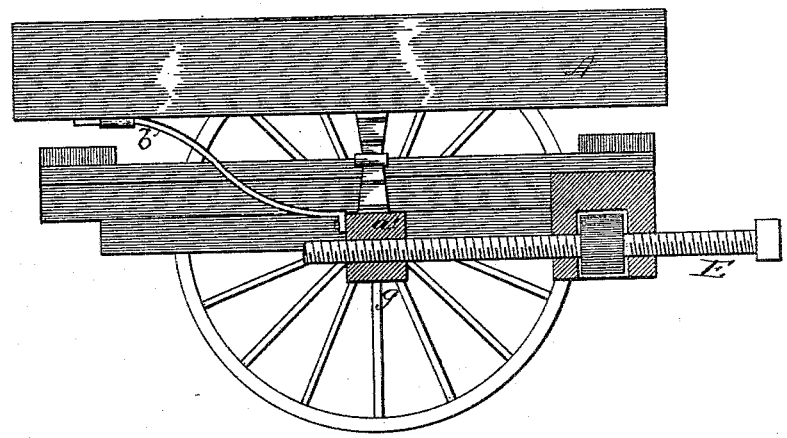

Referring to the accompanying drawings, wherein Figure 1 is a bottom view of a two-wheeled vehicle with my improvements attached, Fig. 2 is a detail view, partly in section, showing the mechanical construction of the device. Fig. 3 is a side view of a two-wheeled vehicle, showing the auxiliary spring. Fig. 4 is a vertical sectional view. Fig. 5 is an end view of a vehicle embodying my invention. Fig. 6 is a vertical longitudinal view of the same.

A represents the body of the vehicle; $a$, the axle of same; B B, the springs; $b\ b$, the auxiliary springs; C C, the grooves in side pieces $a^2$ of body; $c\ c$, the projections or runners which fit and slide in said grooves; D D, the plates holding the runners in position; $d\ d$, the screws for fastening the plates to the runners.

E represents a screw-threaded rod provided with a collar $e$ near its end and having its end formed square to receive the crank or handle F. The collar or shoulder $e$ rotates in a box or bearing G for the purpose of holding the screw-threaded rod stationary, the other end of said rod working a projection $g$ of the iron spring-bar $a'$.

The auxiliary spring $b$ is attached to the axle and to the vehicle-body, as shown in Fig. 3 of the drawings, by permanently fastening it to the axle at one end, the other end being attached to a plate sliding in a groove in the lower part of the body to allow the spring to move with the body. The spring is of special advantage, as it takes up much of the strain which would fall on the other springs and holds the axle in position.

Operation: All the parts being in proper position, as shown, the load and driver or occupants being in the vehicle, the horse is started, and when it is found that the body is tilting the seat-board is raised, crank placed on the end of the screw-threaded rod, and turned toward the left-hand side until the weight is perfectly equalized. When found that there is too much weight on the horse's back, the crank is turned in the opposite direction till the desired result is obtained. This can easily be performed while the vehicle is in motion.

The screw-threaded rod running through the bearing or box having a shoulder therein prevents the rod from moving backward or forward and allows only the rotary movement, the end of rod working through a projection causing the lower part of the vehicle to slide back or forth, as the case may be.

Another great advantage my invention has is as follows: In the manufacture of two-wheeled vehicles much trouble has been experienced to throw from ten to fifty pounds on the horse's back. This could not be readily accomplished on account of being unable to calculate the adjustment of the vehicle-body precisely, this varying and depending greatly on the weight of the vehicle, and the setting of the body required experimenting until the desired overbalance was produced, thus requiring extra time and labor.

Having described my invention, I do not wish to limit myself to this specific construction, as the vehicle may be rendered adjustable by employing a rack and gear-wheels or other suitable mechanism without departing from the spirit of my invention.

Having described my invention, what I claim and desire to secure by Letters Patent is—

1. In a two-wheeled vehicle, the combination, with the body A, having the flanges or guides $c\ c$ located on either side of its base, of the frame A', having the grooved side pieces $a^2$, in which said flanges move, the threaded boss $g$, attached to the axle, the threaded rod E, having the sleeve $e$, and the box G, depending from the body, the several parts being constructed and arranged substantially as described, so that by turning said rod the body will be shifted on the reach, as set forth.

2. In a two-wheeled vehicle, the combination, with an adjustable body and means for operating the same, of auxiliary springs arranged substantially as described, and for the purpose set forth.

3. In a two-wheeled vehicle, the combination of the following elements: screw-threaded rod E, provided with a shoulder $e$, crank F, bearing G, plates D D, runners $c\ c$, projection $g$, spring-bar $a'$, and auxiliary springs $b\ b$, moving with the body A, all arranged and operating substantially as described.

In testimony that I claim the foregoing I have hereunto set my hand this 13th day of July, 1888.

ROBERT W. HARE.

Witnesses:
H. C. EVERT,
LOUIS MOESER.